July 16, 1957 D. S. BOREY 2,799,354
APPARATUS FOR PREVENTING SECONDARY REACTION IN
SOLID CONTACT PROCESSES
Filed Oct. 15, 1954 2 Sheets-Sheet 1
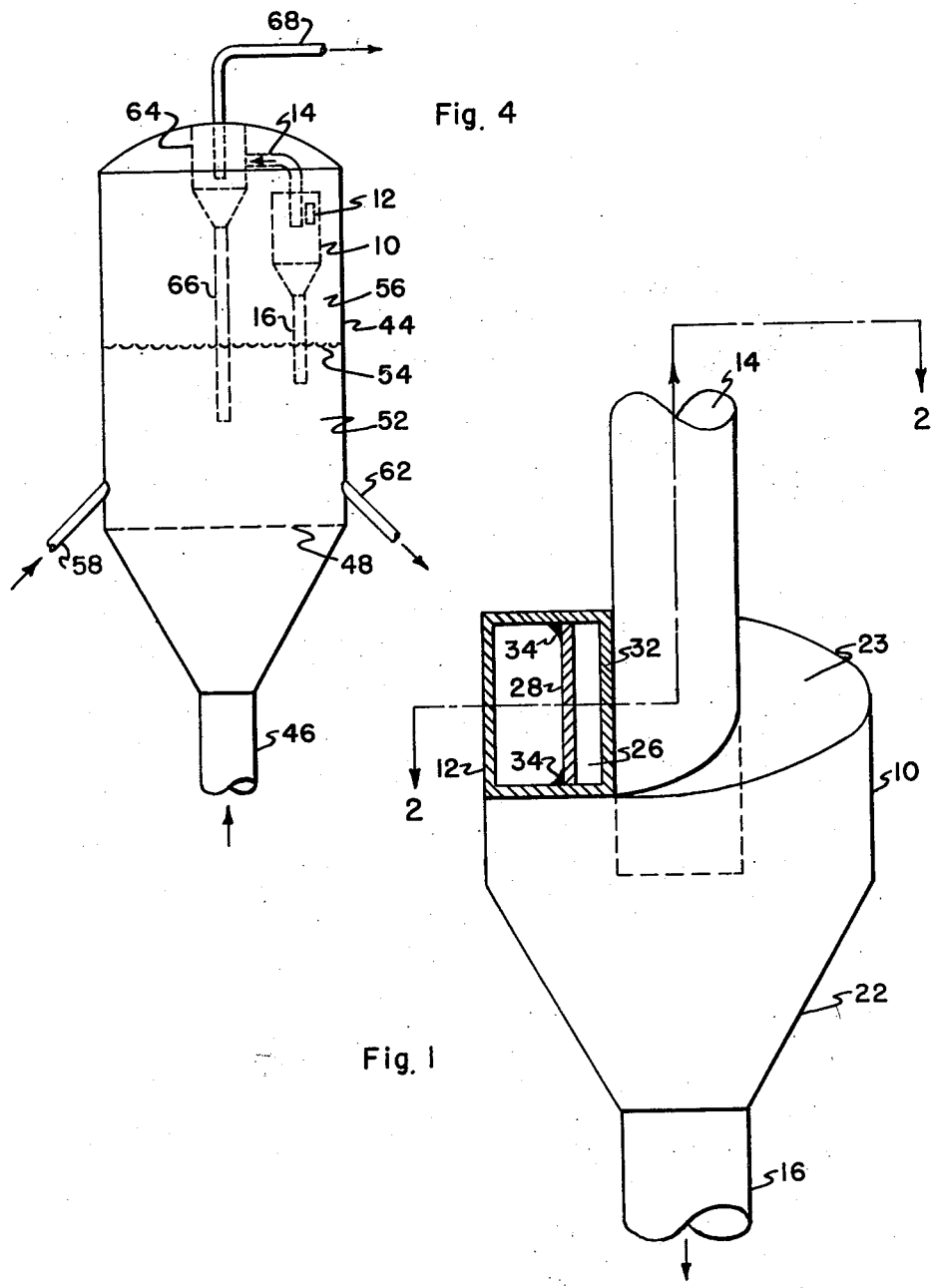
Daniel S. Borey Inventor
By George J. Silhavy
Attorney July 16, 1957 D. S. BOREY 2,799,354
APPARATUS FOR PREVENTING SECONDARY REACTION IN
SOLID CONTACT PROCESSES
Filed Oct. 15, 1954 2 Sheets-Sheet 2
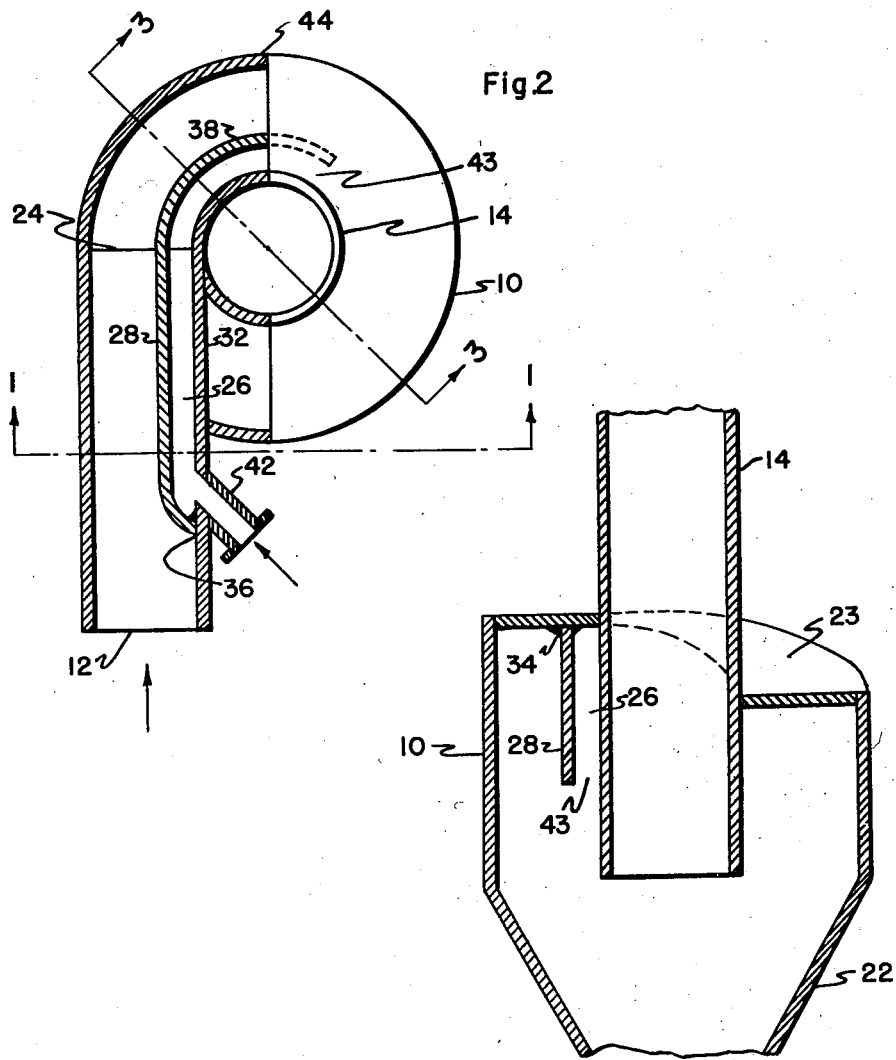
Daniel S. Borey  Inventor United States Patent Office 2,799,354
Patented July 16, 1957

2,799,354

APPARATUS FOR PREVENTING SECONDARY REACTION IN SOLID CONTACT PROCESSES

Daniel S. Borey, Cranford, N. J., assignor to Esso Research and Engineering Company, a corporation of Delaware Application October 15, 1954, Serial No. 462,540

3 Claims. (Cl. 183—32)

This invention relates to apparatus for carrying out reactions in gaseous or vapor phase at relatively high temperatures and in the presence of finely divided solids and more particularly relates to controlling afterburning in the regeneration of finely divided spent or fouled catalyst particles in hydrocarbon conversion operations.

In many reactions where finely divided solids are used as contact agents it is desirable to separate the solids quickly after the reaction is completed and then quench or cool the reaction products without substantially cooling the solids. Also in some reactions burnable deposits are laid down on the solid contact particles and the particles are regenerated by burning off the burnable deposits with air or other oxygen-containing gas. In the catalytic conversion of hydrocarbons, coke or carbonaceous material is deposited on the catalyst particles and the catalyst particles are then passed to the regeneration zone where the coke or carbonaceous material is burned off. The regeneration is exothermic and must be controlled to avoid overheating the catalyst particles.

In the catalytic conversion processes using powdered or finely divided catalyst the catalyst is circulated from the reaction zone to the regeneration zone where it is regenerated and the regenerated catalyst is then returned to the reaction zone. In the regeneration zone the spent catalyst is mixed with air and the coke or carbonaceous material is burned off. The finely divided catalyst particles are maintained as a dense fluidized turbulent bed in the regeneration zone having a lower dense phase and an upper dilute phase. The combustion or regeneration gases leaving the dense bed contain entrained catalyst particles which are removed by passing the combustion gas through one or more separating devices such as cyclone separators.

The gases leaving the dense bed in the regeneration zone contain carbon monoxide and some unburned hydrocarbons and excess oxygen. The combustion of the coke or carbonaceous material in the dense fluidized bed does not result in excessively high temperatures because sufficient solids are present to absorb the heat. However, when insufficient solids are present in the gases leaving the dense catalyst bed or in any of the outlet lines carrying the combustion gases away from the regeneration zone following the cyclone separators, combustion may result in undesirable high temperatures which are harmful to the catalyst and to the equipment. Such combustion referred to as afterburning does not occur to any great extent if the temperature is maintained below about 1075° F. or if the oxygen content of the gases is low, below about 1.5% by volume of the outlet combustion gases but if afterburning is once started the burning continues and is self-sustaining due to the higher reaction rate at the high temperatures and the temperature goes up rapidly.

This afterburning has occurred in the primary cyclone separator and the secondary cyclone separator in the regeneration zone of cracking units and in the duct work connecting the cyclone separators. In the primary cyclone separator the major portion of the entrained solids or catalyst particles are separated from the outgoing combustion gas and as a result there are insufficient solids to absorb the heat and if there is a sufficient amount of oxygen present, afterburning will occur.

To prevent afterburning quench gas sprays such as steam were first installed in the connecting duct work between the primary and secondary cyclone separators but this was not successful. Then quench gas sprays were introduced into the primary cyclone separator outlet line but with such a quench, afterburning can still start in the body or cone of the primary cyclone separator. Quenching in the outlet line of the primary cyclone separator has the further disadvantage that the quenching gas is injected countercurrent to the primary cyclone separator exit vapor or gas which cuts down on cyclone separator efficiency.

The object of the present invention is to prevent afterburning by introducing an inert quenching gas in the primary cyclone separator in sufficient amount to cool the combustion gases to a lower temperature.

According to this invention the inert quenching gas is introduced through a duct formed in the cyclone separator. The duct curves around the solids outlet pipe so that the flow of quench gas is concurrent with the combustion gas flow in the cyclone gas separator and the stream of gas in the cyclone separator is not disturbed and maximum cyclone separator efficiency is obtained. The duct extends around to at least about the first 90° turn in the cyclone separator body where a major portion of entrained solid particles are removed by centrifugal action from the combustion gas so that the combustion gas is quenched almost instantly after most of the solid particles have been removed from the gas stream. At the same time there is minimum cooling of the solid or catalyst particles.

In the drawings:

Fig. 1 represents a vertical cross-section taken at substantially line 1—1 of Fig. 2;

Fig. 2 represents a partial transverse horizontal section taken substantially on line 2—2 of Fig. 1;

Fig. 3 represents a vertical cross-section taken substantially on line 3—3 of Fig. 2; and Fig. 4 represents a diagrammatic showing of one form of reaction vessel adapted to be used in the present invention.

Referring now to Figs. 1 and 2, the reference character 10 designates a cyclone separator housing provided with inlet 12 for passing a suspension of solids in a gas to the cyclone separator. The cyclone separator is provided with a vertical gas outlet pipe 14 and a bottom solids outlet line 16. The gas outlet pipe 14 extends down into the cyclone separator and terminates at the top of the conical section 22. As shown in the drawings, the top of the cyclone separator housing has a downwardly sloping portion shown at 23 which forms the top wall of a spiral which the gases take in going through the cyclone separator. The bottom plate or wall of inlet line 12 terminates at about the zone where inlet line 12 starts to curve as shown at 24 in Fig. 2.

The inlet line 12 has a straight portion as shown in Fig. 2 which is tangent to the main body as in a usual cyclone separator. Inlet line 12 is provided with a false inlet duct generally indicated at 26 and formed by vertical partition or plate 28 which extends for the entire height of the inlet line or duct 12 and which is spaced from the inner wall 32 to form the false inlet conduit 26. The vertical plate 28 is secured in position by welding at the top and bottom as shown by the darkened areas 34 in Fig. 1. As shown in Fig. 2 the vertical plate 28 at its front end is sealed or attached to the side wall of the inlet duct 12 for its entire height so that gas introduced into the conduit or line 26 cannot enter the inlet duct 12 at this point. Further as shown in Fig. 2, the vertical plate extends from near the entrance of the inlet duct 12 into the cyclone separator substantially paralleling the inner wall 32 of the inlet duct and then curves around the gas outlet pipe 14 as shown at 38. The curved portion 38 is substantially concentric with the outlet pipe 14. The inner end of the plate or partition terminates at the point or region where the gas stream flowing through the cyclone separator completes 90–180° of the first revolution in the cyclone separator body.

As shown in the drawing the inner end of the plate extends beyond the 90° portion but it may be extended to the 180° portion. The top portion of the plate is welded or otherwise secured to the top wall of the inlet duct 12. The portion of the vertical plate 28 extended into the cyclone separator body beyond line 24 in Fig. 2 has only its top portion welded to the underside of the top wall of cyclone housing, whereas at the inlet and in the inlet duct 12 both the top and bottom of the plate 28 are welded or otherwise sealed with the top and bottom of the inlet duct. The free bottom edge of plate 28 is horizontal and maintained at the same elevation as the bottom surface of inlet duct 12.

An inlet 42 is provided for introducing inert quenching or cooling gas into the false inlet duct 26. The line 42 opens into the duct 26 beyond the point 36 where the plate 28 is rigidly attached or secured to the inner wall 32 of the inlet duct. When inert cooling gas is introduced to line 42 into the duct 26, it follows the confined path in the inlet duct portion as shown in Fig. 1 but then as the duct goes into the cyclone separator body beyond line 24 in Fig. 2 where the bottom plate or wall of inlet line 12 terminates, the lower portion of the plate 28 is not welded or secured at its bottom portion as shown in Fig. 3 and this permits the inert cooling gas to flow both from the open end 43 of the duct (Fig. 2) and the bottom 43' of the duct (Fig. 3) within the cyclone separator body. The upper end of plate 28 beyond line 24 in Fig. 2 is welded to the underside of the top wall as shown in Fig. 3.

Gases containing solids in suspension are introduced through the inlet duct 12 and subjected to centrifugal action by the spiral path in the cyclone separator and by the time the gases have completed the first 90° turn in the cyclone separator body substantially at region 44 shown in Fig. 2, most of the solid particles have been removed from the suspending gas. That is, the solids have been thrown against the outer wall and pass downwardly and the gases continue their downward spiral path. The gases finally enter open bottom end of gas outlet pipe 14 and pass upwardly therethrough while solids pass down to solids outlet line 16. The present invention utilizes this separation effect and with the false inlet duct 26 provides means whereby the high temperature gases passing through the cyclone separator are quenched or cooled almost instantly after most of the solid particles have been removed from the gas stream. Quenching gas introduced through duct 26 is injected from the open end 43 into the high temperature gases at or beyond the region 44 where most of the solids have been removed from the gases so that the gases are cooled or quenched without substantial cooling of the separated solids. In this way less cooling is required and heat is not lost from the solids. Quenching gas is also introduced into the interior of the cyclone separator from the open bottom end 43' of duct 26.

In the regeneration of catalyst particles used in the conversion of hydrocarbons the regeneration zone is maintained at a relatively high temperature and with this invention, after-burning is minimized by holding to an absolute minimum the time that the gases remain unquenched after most of the solids have been removed from the gas stream to provide a very dilute suspension of solids in gases. Maximum quench efficiency and minimum catalyst cooling is obtained by the injection of steam or other inert gas along the inner portion of the stream of gases passing through the cyclone separator where the lowest catalyst concentration exists. It will be noted that with the present invention the quenching or cooling gas is injected concurrent to the gas flow through the cyclone separator so that the cyclonic streams are undisturbed and maximum cyclone efficiency is obtained.

In Fig. 4 there is diagrammatically shown a reaction chamber which will be described in connection with the regeneration of catalyst used in the cracking of hydrocarbons but it is to be understood that the invention is not restricted to this reaction. In Fig. 4 there are shown two stages of cyclone separators but more or less may be used, if desired. As the catalyst any known cracking catalyst may be used such as synthetic silica alumina gel catalyst having a particle size between about 200 and 400 standard mesh or finer or having an average size of about 50 microns to 90 microns. The air is introduced into the bottom of the reaction zone 44 through line 46 and is distributed within the reaction zone by passing through grid or perforated member 48. The superficial velocity of the gases passing upwardly through the reaction zone 44 is between about 1.5 feet per second and 3.0 feet per second, preferably 2.5 feet per second. At this preferred velocity a dense fluidized turbulent mixture of catalyst 52 is produced having a level 54 and a dilute phase 56 thereabove. An inlet line for catalyst is shown at 58 and catalyst withdrawal line is shown at 62. The density of the dense turbulent mass 52 is between about 20 lbs. per cubic foot and 30 lbs. per cubic foot and preferably about 25 lbs. per cubic foot when using the preferred superficial velocity above given.

The gases passing up into the dilute phase 56 entrain catalyst particles with them and the catalyst content of the dilute phase gas is between about 0.3 lb. per cubic foot and 1.0 lb. per cubic foot and will be about 0.7 lb. per cubic foot when using the preferred superficial velocity.

The temperature during regeneration may vary between about 1000° F. and 1200° F. and for this example the regeneration temperature is about 1125° F. so that the temperature in the dilute phase 56 will also be about 1125° F. At this temperature and with combustible material such as carbon monoxide and hydrocarbons present, the minimum operable concentration of the oxygen in the dilute phase will normally be about 2% by volume and at this concentration there is a strong tendency for afterburning to occur when the solids are removed from the gases leaving the dilute phase and passing through the cyclone separation stage or stages and it is the object of this invention to prevent such afterburning.

The gases from the dilute phase pass through the inlet 12 into the primary cyclone separator 10 where most of the entrained catalyst particles are removed and returned to the dense bed 52 through dipleg or solids outlet line 16. The primary cyclone separator is the one provided with the false inlet 26. The denuded combustion gases leave the cyclone separator through gas outlet line 14 and pass to secondary cyclone separator 64 having dipleg 66 for return of solids to dense bed 52 and gas outlet line 68 for removal of separated gases. In passing through the first cyclone separator 10, 95 to 99% of the entrained solids are removed from the dilute suspension passing through the cyclone separator. For the specific example being given here and if afterburning should occur under these conditions there would be insufficient solids to absorb the heat and runaway temperatures would be obtained. Such high temperatures seriously damage the apparatus.

To prevent afterburning and with cyclone separator 10 being of the design shown in Figs. 1–3 of the drawings, steam is introduced through line 42 and is passed through false inlet duct 26 enclosed in the inlet line 12 and after most of the solids or catalyst particles are removed from the gas stream by passing through the first 90° angle of the cyclone path the cooling or quenching steam is introduced into the path going through the cyclone separator from the end 43 of the false inlet duct shown in Fig. 2. The steam introduced through line 42 is at a temperature of about 338° F. for this specific example but may vary between about 260° F. and 350° F. for different conditions. The amount of steam used is sufficient to reduce the temperature of the combustion gases going through the spiral path 25 and cyclone separator by about 50° F., with sufficient equipment flexibility so that the flue gas could be cooled so that the temperature of the gases will be reduced to between 25 and 75° F.

For cracking about 28,000 barrels of gas oil per day and regenerating the catalyst in a regenerator by burning 17,000 lbs. per hour of coke, the flue gases entering the cyclones will amount to about 91,000 cubic ft. per minute measured at vessel conditions of 10 p. s. i. g. and 1125° F. To cool this quantity of gas 50° F. will require injection of 8300 lbs. per hour of 338° F. steam into the cyclones. In a unit of this size 6 sets of cyclone separators 10 will be used, each having an opening or inlet 12 of about 12 inches by 29 inches or the equivalent area in another shape. Each set of cyclone separators includes a primary cyclone separator and a secondary cyclone separator so that a total of twelve cyclone separators will be used. The gas outlet pipe 14 will have a diameter of about 27 inches. The diameter of the largest horizontal portion of the cyclone separator 10 will be about 53 inches. The conical section 22 of the cyclone separator will be about 7 feet in height and the lower portion of the conical section where it connects with the solids outlet line 16 will be about 2 feet. The vertical plate 28 has a height equal to the depth of the inlet 12 and it is located so as to provide a half-inch to three-quarter inch wide opening 26 for the quench steam flow.

While the apparatus has been described in connection with the afterburning problem in regeneration it is not to be restricted thereto but can be used in other reactions where immediate quenching or cooling of the reaction product is desired following separation of solid contact or catalyst particles from the reaction product.

What is claimed is:

1. An apparatus for separating solids from gaseous suspensions which includes a housing having an inlet conduit, a gas outlet pipe, a solids outlet pipe and a curved path around said gas outlet pipe, a separate duct in said inlet conduit formed by a side wall of said inlet conduit and a parallel spaced vertical plate extending from the top to the bottom of said inlet conduit and in sealed relation therewith, said plate at its one end near the inlet of said inlet conduit being in sealed connection with the adjacent side wall of said inlet conduit, said vertical plate extending into said curved path and spaced from and concentric with said gas outlet pipe, said plate extending into said curved path for 90° to 180° and at its inner end portion being attached only at its upper edge to the upper wall of said curved path to leave an opening in the space between the bottom of said plate and the bottom wall of said curved path, the inner curved end of said plate being spaced from said gas outlet pipe to leave a vertical opening, and means for introducing gas into the end of said duct near the inlet of said inlet conduit so that the gas passes through said duct as a separate stream and is then discharged from the other end of said duct into said curved path.

2. An apparatus for separating finely divided solids from gaseous suspensions thereof, which includes a cylindrical housing having an inlet conduit for gaseous suspensions, a vertically arranged gas outlet pipe, a solids outlet pipe and a curved path around said gas outlet pipe whereby solids are thrown outwardly toward the wall of said housing by centrifugal force as the gaseous suspension passes through said curved path, a separate duct in said inlet conduit formed by a side wall of said inlet conduit and a parallel spaced vertical plate extending from the the top to the bottom of said inlet conduit and in sealed relation therewith, said plate at its one end near the inlet of said inlet conduit being in sealed connection with the adjacent side wall of said inlet conduit, said vertical plate extending into said curved path and having its inner end curved and spaced from and concentric with said gas outlet pipe, said plate at its inner curved end portion being attached at its upper edge to the upper wall of said curved path formed in said housing, the end of said inner curved portion of said plate being spaced from said gas outlet pipe to leave a vertical opening, and means for introducing a cooling gas into the end of said duct near the inlet of said inlet conduit so that the cooling gas passes through said duct as a separate stream and is then discharged from the other end of said duct into said curved path and into the gaseous suspension following centrifugal removal of solids therefrom whereby efficient cooling of the gas is obtained with minimum cooling of the separated solids.

3. An apparatus according to claim 2 wherein said curved inner end of said plate extends into said curved path for 90° to 180°.

References Cited in the file of this patent

UNITED STATES PATENTS

| | | |
|---|---|---|
| 1,478,750 | McElroy | Dec. 25, 1923 |
| 1,754,126 | Stievenart | Apr. 8, 1930 |
| 2,295,101 | Dunham | Sept. 8, 1942 |
| 2,650,675 | Yellott | Sept. 1, 1953 |
| 2,659,448 | Welsh | Nov. 17, 1953 |

FOREIGN PATENTS

| | | |
|---|---|---|
| 658,471 | Great Britain | Oct 10, 1951 |